Oct. 30, 1945.  G. I. HOLMES  2,387,792

VALVE

Filed Dec. 11, 1939  2 Sheets-Sheet 1

Inventor
Gifford I. Holmes
By George H. Fisher
Attorney

Oct. 30, 1945.  G. I. HOLMES  2,387,792
VALVE
Filed Dec. 11, 1939  2 Sheets-Sheet 2

Inventor
Gifford L. Holmes
By George H. Fisher
Attorney

Patented Oct. 30, 1945

2,387,792

UNITED STATES PATENT OFFICE 2,387,792

VALVE

Gifford I. Holmes, Minneapolis, Minn., assignor to Minneapolis-Honeywell Regulator Company, Minneapolis, Minn., a corporation of Delaware Application December 11, 1939, Serial No. 308,541

16 Claims. (Cl. 236—48)

This invention relates to fluid controlling valves and more particularly to valves including certain safety features.

An object of this invention is to provide a valve of the modulating type operated by a temperature responsive bellows with provision to close the valve should a leak develop in the bellows capillary tube or bulb.

Another object is to provide a valve of the above type having means to cause the valve to snap open a certain percentage of its complete range of travel.

Another object is to provide a valve which will close automatically when excessive pressure arises in the fluid passing through the valve.

Other objects will become apparent from the specification, claims and drawings.

Figure 1:
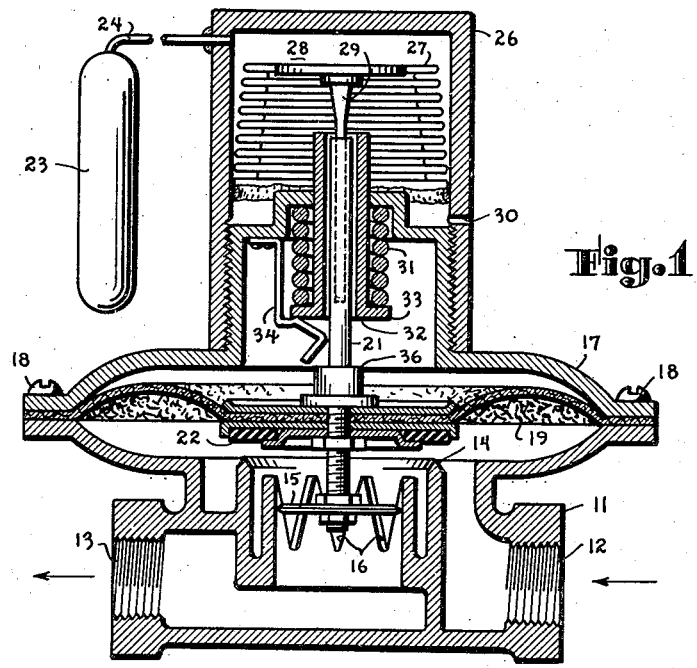
Figure 1 is a sectional view of a thermostatically controlled gas valve.

One modification of the invention as illustrated in Figure 1 comprises a modulating gas valve which operates in response to the temperature acting on a temperature responsive bulb and is also provided with means to prevent very small openings of the valve. It is further provided with a safety device which will close the valve should a leak occur in the temperature responsive mechanism. One of the difficulties that has been encountered with temperature responsive mechanisms of this type has been that when a leak occurs anywhere in the space occupied by the temperature responsive element, the fluid pressure is reduced and the valve tends to stay open even on excessive temperatures. The present invention is adapted to prevent such an unsafe condition.

The valve comprises a lower valve casing 11 having inlet and outlet openings 12 and 13, a valve seat 14, and modulating V ports 16. An upper valve casing 17 is suitably secured to the lower casing 11 by screws 18 which serve also to clamp a flexible diaphragm 19 between the upper and lower valve casings.

A valve stem 21 carries a movable valve disc 22 which seats against the valve seat 14 to form a pressure tight seal when the valve is completely closed. The diaphragm 19 is also attached to the valve disc 22 and to the valve stem 21 so that the central portion of the diaphragm moves up and down with the valve element. The valve stem 21 also carries below the valve disc 22 a modulating disc 15 which cooperates with the V ports 16 to give a modulated gas flow for various positions of valve stem 21.

The temperature responsive mechanism comprises a bulb 23, a capillary tube 24, a casing 26 of noncorrosive material which is screwed to the upper valve casing 17 and a flexible metal bellows 27 also of noncorrosive material which is soldered at its lower end to the interior of the casing 26 so that a pressure chamber 28 is formed above the bellows 27. The bulb 23, tube 24, and chamber 28 are filled with a suitable volatile liquid. As is well known, any change in temperature on the bulb 23 will result in changes in pressure within the chamber 28 to expand or contract the bellows 27.

The upper end of the valve stem 21 is drilled to receive a rod 29 which is secured to the underside of the bellows 27 so that as the bellows is expanded and contracted the rod 29 will change its position and consequently position the valve stem 21 if there is any force tending to open the valve. A port 30 in the casing 26 assures that the pressure above diaphragm 19 is always atmospheric pressure.

The common type of gas burner in use today is capable of maintaining a steady flame over a wide range of gas pressures, but if the pressure is reduced sufficiently unstable combustion will result or the fire will go out. Consequently a modulating gas valve should never permit less than a certain minimum gas flow. Means have been provided in the present invention to obtain a sudden movement of the valve between closed and a predetermined minimum open position. If gas pressure is admitted to the inlet port 12 there will be a pressure under the diaphragm 19 tending to open the valve. Assume now that the temperature acting on bulb 23 is high enough so that the metal bellows 27 is forced downwardly and the valve is closed. As the temperature on the bulb 23 decreases there will be less and less force holding the valve shut and the gas pressure under diaphragm 19 will more nearly counter-balance the downward force. When the pressure under the diaphragm 19 is sufficient to move the valve element 22 slightly off the seat 14 against the force due to the pressure in chamber 28 then the pressure under the diaphragm 19 will also exist under the additional area of the valve disc 22 uncovered by the slight opening of the valve and this extra force upward on the movable parts of the valve will be sufficient to move the valve open a predetermined amount or until the metal bellows 27 has been moved upward enough so that sufficient pressure is developed in the chamber 28 to counterbalance further upward movement of the valve stem. From this position of the valve further opening movement will be modulated in response to the temperature of the bulb 23 in the usual fashion.

The valve likewise will close suddenly from a minimum open position because as the valve disc closely approaches the seat 14 the pressure under the seat 14 will be so reduced as to reduce the upward force of the gas pressure. Since further closing of the valve further reduces the pressure under the disc 22 it will snap shut.

This valve also incorporates a safety feature now to be described. Bearing against the upper interior surface of the upper valve casing 17 is a helical coil spring 31 which is normally held in a contracted condition by the sleeve member 32 which is supplied with a flange 33 at its lower end. A spring latch 34 is suitably secured to the interior of the upper valve casing 17 and normally holds the sleeve 32 in the position shown in which the spring 31 is contracted. Attached to the valve stem 21 is a collar 36 which, should the valve be opened an excessive amount, would engage the latch 34, force it to the left, and consequently release the sleeve 32. The spring 31 will then expand to act as a biasing means and move the sleeve member 32 downwardly to close the valve by engaging the collar 36. The spring 31 is of sufficient strength to counter-balance any gas pressures which would be encountered under the diaphragm 19.

It will be apparent that any leak which might occur in the bulb 23, tube 24, or chamber 28 would result in the valve becoming opened an excessive amount. The mechanism just described will serve to automatically close the valve, thus providing a safety feature for preventing the valve from remaining in such a position.

Figure 2:
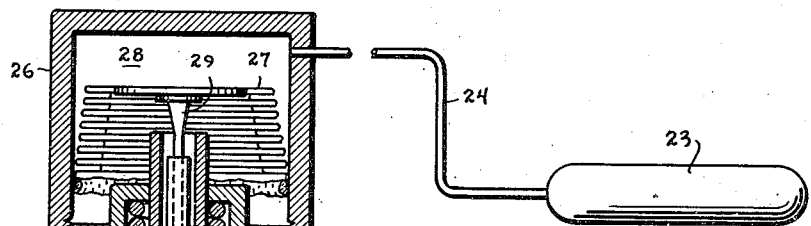
Figure 2 is a sectional view of another thermostatically controlled gas valve.

The valve shown in Figure 2 is somewhat similar to that of Figure 1 with the exception of the means utilized to obtain a quick movement between closed and a minimum open position and consequently similar reference characters will be used on the corresponding parts. The lower valve housing 11 has inlet and outlet ports 12 and 13, respectively. The upper valve housing 17 is secured to the lower valve housing 11 by means of the screws 18 which serve to compress a pressure gasket 41 between the upper and lower housings. The valve itself consists of a movable valve element 22 which engages the valve seat 14 to obtain a tight shut off. A modulating valve disc 15 moves over the V ports 16 to give a modulated flow of gas for various open positions of the valve.

The temperature responsive parts of this valve are the same as those described in Figure 1 and comprise a bulb 23, tube 24 and chamber 28. The volatile liquid within the chamber 28 presses downwardly on the flexible bellows 27 to determine the position of the valve.

Figure 3:
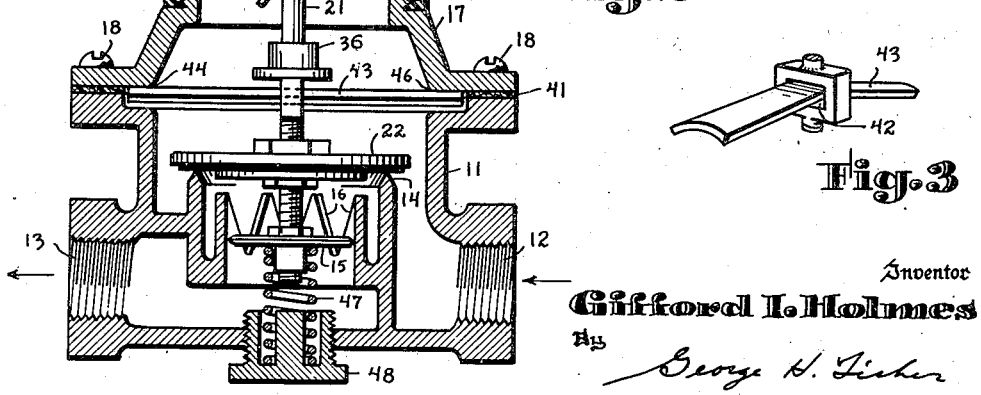
Figure 3 shows the bowed snap spring incorporated in the valve of Figure 2.

The valve stem 21 is provided with an aperture 42, as best shown in Figure 3, through which passes a leaf spring 43 which is bowed transversely but is normally straight longitudinally. As shown in Figure 2 the outer ends of this spring rest against the upper valve housing 17 at 44 and 46. The valve is so adjusted that when the valve is closed the spring 43 will assume the straight position as shown in Figure 2 but will be slightly tensioned upwardly in the middle by the valve stem so that there will be a slight downward pressure at the ends of the spring at 44 and 46. A spring of this type because it is bowed transversely offers considerable resistance to bending from the position shown in Figure 2 to that transversely flattened longitudinally bowed position shown in Figure 3, but once the center of the spring has become flat as shown in Figure 3 very little force is required to bend it further. The spring 43 offers a greater initial resistance to bending because it is channeled, but once bent offers only the resistance of a leaf spring. The change from one position to the other occurs with a quick or snap action. This characteristic of the spring is utilized here to obtain a snap action of the valve disc between closed and a minimum open position. This feature is desirable in controlling the gas flowing to gas burners because a minimum initial flow is required in order to light the burner and also to maintain reliable combustion. A spring 47 acts upwardly on the valve stem and cooperates with the bellows 27 to open the valve. A screw plug 48 serves to support the spring and adjust its tension.

As the temperature at the bulb 23 is lowered the force exerted downwardly by bellows 27 will decrease until a point is reached where the spring 47 acting upwardly on the lower end of the valve stem 21 will be sufficient suddenly to bend the leaf spring 43 from the position shown in Figure 2 to that shown in Figure 3. Further reductions in the pressure on bellows 27 will gradually change the position of the valve between this minimum open position and a normal full open position.

Likewise as the temperature of bulb 23 increases the valve stem 21 will be gradually lowered until spring 43 approaches a straight condition, spring 43 will then tend to straighten out suddenly so that the combined effect of spring 43 and the pressure on bellows 27 is sufficient to completely close the valve against the force of spring 47.

The safety feature of this valve is exactly the same as described in connection with the valve of Figure 1. If the pressure in chamber 28 becomes excessively reduced due to a leak, collar 36 on valve stem 21 will be forced upwardly by the spring 47 and release the latch 34 permitting the stronger spring 31 to close the valve.

Figure 4:
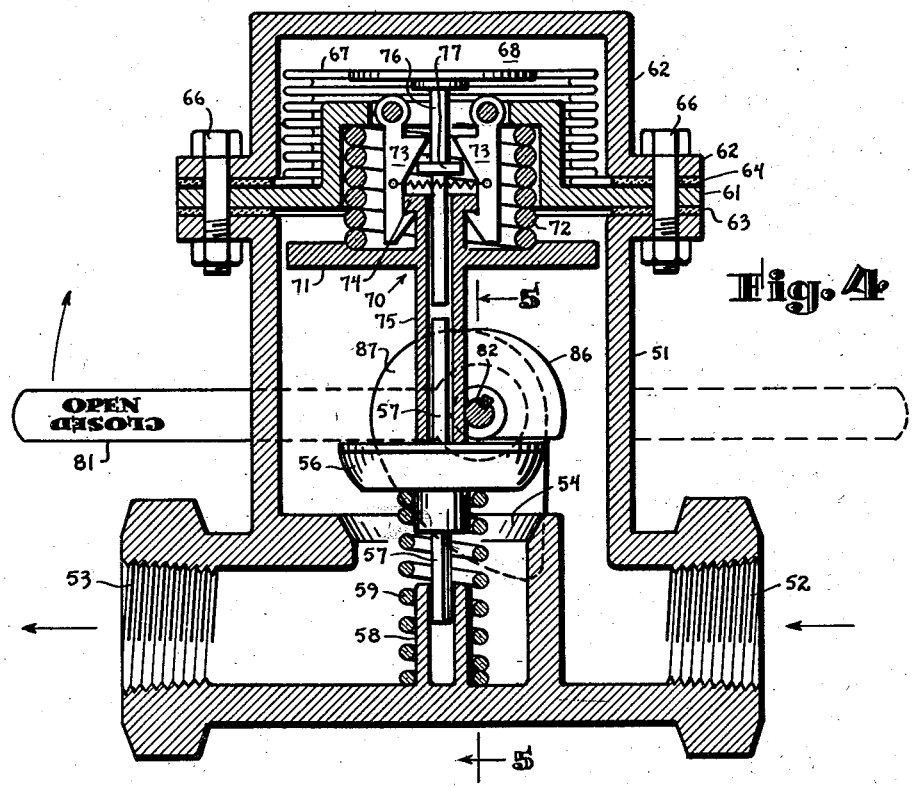
Figure 4 is a sectional view of a valve designed to close on high pressure within the valve itself.
Figures 5, 6:
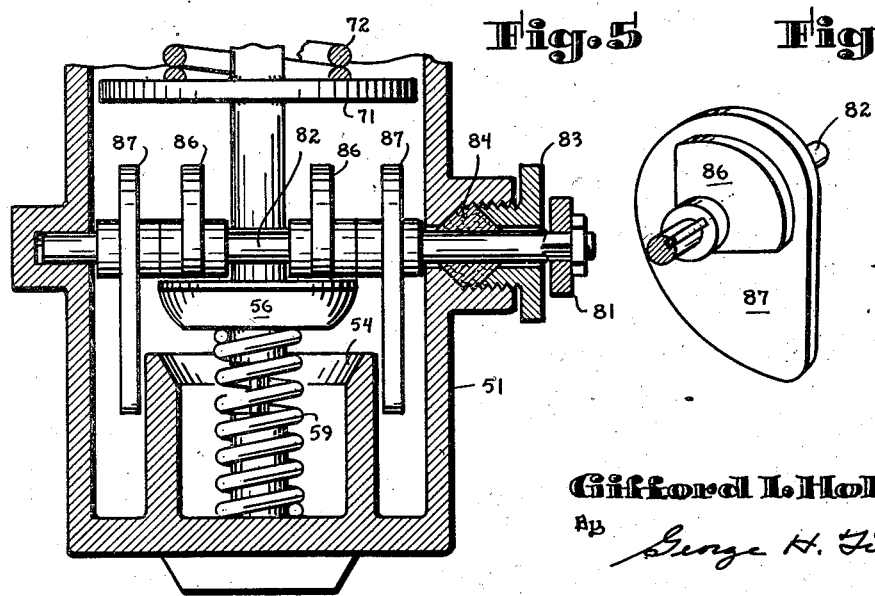
Figure 5 is a section taken on lines 5—5 of Figure 4.
Figure 6 is a perspective of cams used in the valve of Figure 4.

The valve shown in Figures 4, 5, and 6 is designed to automatically close in case excessive pressures exist in the fluid passing through the valve. One application of this valve is in the pipe line leading from the city water mains to a residence or the like. In some localities the fire department greatly increases the pressure in the city mains in the area of the city near a fire. Thus the plumbing fixtures in residences of that area are endangered by this high pressure. This valve will automatically isolate the house plumbing from these excessive pressures when they arise.

The valve comprises a valve housing 51 having inlet and outlet ports 52 and 53, respectively, and a valve seat 54. A movable valve disc 56 has a rod 57 secured thereto and passing vertically therethrough. The rod 57 is slidable in a boss 58 cast into the lower part of the housing 51. The rod 57 therefore serves as a guide for the valve disc 56. A helical compression spring 59 is carried around the boss 58 and at all times tends to hold the valve disc 56 in open position.

Bolted to the top of the valve casing 51 is a plate 61 and a cover 62. A gasket 63 lies between the housing 51 and the plate 61 while the plate 61 and the cover 62 are separated by a thin layer of solder 64 which serves to form a pressure tight seal between these two elements. Bolts 66 hold the cover 62 and the plate 61 securely to the housing 51. Mounted on the plate 61 and supported interiorly of the cover 62 is an expansible metal bellows 67 forming a chamber 68 between the bellows 67 and the cover 62.

Carried above the valve disc 56 on rod 57 is a valve closing element 70 which comprises the plate portion 71 which is integral with a cylindrical portion 75 at right angles thereto. The cylindrical portion 75 receives the upper end of the rod 57 which is secured to the valve disc 56. Between the element 70 and the plate 61 is a compression coil spring 72. A pair of latch members 73 are pivoted in the plate 61 and normally engage a collar 74 on the cylindrical portion 75 of the closing element 70 to hold the same in its upper position as shown.

Extending downwardly from the top of the metal bellows 67 is a rod 76 which carries a collar 77. When the bellows 67 expand upwardly the collar 77 will engage cam portions of the latch members 73 to release the valve closing element 70.

A sufficient gas pressure is introduced to chamber 68 by any suitable means (not shown) in an amount sufficient to counter-balance all normal pressures of a fluid within the valve casing 51. Should pressure within the valve become excessive, however, the bellows 67 will move upwardly to operate the releasing mechanism of the closing element 70 which will be forced downwardly by the strong spring 72 to overcome the upward force of the lighter spring 59 and close the valve 56. Also, if the gas pressure within the chamber 68 should become dissipated due to a leak therein, the tension of the bellows will move the releasing mechanism upwardly to close the valve.

Provision is also made for manually closing the valve and for resetting the valve to open position after it has been closed either manually or automatically. A hand lever 81 is secured to the end of a shaft 82 which is pivoted in the valve casing 51. A gland 83 cooperates with packing 84 to prevent leakage around the shaft 82. The cams 86 which are rigidly secured to the shaft 82 enable the valve to be closed manually by rotating the lever 81 clockwise as shown in Figure 4. The cams 86 will engage the top of valve disc 56 to force it downwardly against the action of the spring 59. The upper part of the rod 57 will slide within the valve closing element 70, the valve closing element remaining stationary. The valve will then remain closed as long as lever 81 is in dotted position as shown in Figure 4.

Also secured to the shaft 82 are the larger cams 87 which serve to open the valve when it has been closed automatically. When the valve has been closed automatically the valve closing element 70 will be lowered so that cams 87 are nearly in engagement with the disc portion of the closing element. Rotating the lever 81 clockwise from the position shown in Figure 4 will cause the cams 87 to engage disc portion 71 of the element 70 to raise the closing element 70 until the latches 73 have again engaged the collar 74 at the top of the closing element 70. It should be noted that in case excessive pressure still exists it will be impossible to open the valve. If excessive pressure exists, the latches 73 will still be in an outward position in which it will be impossible for them to engage the collar 74 at the top of the element 70. As the large cams 87 are lifting the closing element 70, the small cams 86 prevent opening of the valve disc 56. In this way it will be seen that what is known as a "trip free" valve has been provided because it impossible to hold the valve in open position when a high pressure exists in the supply line to the valve.

While several modifications have been shown and described it is to be understood that the scope of this invention is to be determined only by the appended claims.

I claim as my invention:

1. In combination, a control device normally movable between a safe first position and an active second position, direct acting condition responsive pressure means indicative of temperature normally for positioning said device between said first and second positions, and independent means for moving said device to said first position if said pressure means moves said device beyond said second position.

2. A thermostatic valve comprising a movable valve member, an expansible metallic bellows containing a volatile fluid for positioning the valve member in accordance with temperature, closing means for closing the valve member, a latch for holding the closing means in inoperative position, said latch being releasable by the valve member when the pressure of the volatile fluid within the metallic bellows is reduced excessively.

3. An automatically operable valve, comprising, a movable valve member, a condition responsive element adapted to control the position of the valve member between closed and a normal full open position, a diaphragm acting on the valve member and responsive to the pressure of the fluid on the high pressure side of the valve for causing the valve member to move between closed and partly opened positions with a quick action, a spring adapted to close the valve member, and a latch normally for holding the spring in inoperative position releasable by the condition responsive element when in an excessively wide open position.

4. A valve comprising a movable valve member, means tending to move the valve member toward open position, a condition responsive element adapted to position the valve member against the action of said means, a transversely bowed leaf spring for imparting a snap action to the valve member between closed position and a minimum open position, biasing means for positively closing the valve, latching means normally for holding the biasing means in inoperative position, said latching means being releasable by the valve member when the valve member assumes an excessively wide open position.

5. In combination, a control device movable between a safe first position and an active second position, said device being biased to said second position, resiliently actuated means for moving said device to said first position, restraining means normally for restraining said resiliently actuated means in a position in which it is inoperative to move said control device to said first position, first cam means rotatable on a shaft for moving said resiliently actuated means to a position in which engagement with said restraining means may be effected, and second cam means rotatable on the same shaft as said first cam means for holding said device in said first position until said restraining means engages said resiliently actuated means.

6. In combination, a control device movable between a safe position and an active position, resiliently actuated means for moving said device to said safe position, restraining means normally for restraining said resiliently actuated means in a position in which it is inoperative to move said device to said safe position, a strain release connection between said resiliently actuated means and said control device, a rotatable shaft, and cam means carried by said shaft and operative upon rotation of said shaft to move said resiliently actuated means into engagement with said restraining means and simultaneously extend said connection so as to effect engagement of said resiliently actuated means and said restraining means without movement of said control device from said safe position, said strain release connection being effective upon said resiliently actuated means being held by said restraining means and said cam means being moved to a position permitting contraction of said connection to move said control element to said active position.

7. In combination, a valve movable between a safe and an active position, resiliently actuated means for moving said valve to said safe position, restraining means normally for holding said resiliently actuated means in a position in which it is inoperative to move said valve to said safe position, a first pair of cams for moving said resiliently actuated means to a position in which engagement with said restraining means may be effected, and a second pair of cams for holding said valve in said safe position until said restraining means engages said resiliently actuated means.

8. In combination, a valve casing, a valve seat therein, a valve movable to and away from said seat, biasing means urging said valve away from said seat, a valve stem fixed to said valve, a sleeve coaxially arranged with said valve stem, said sleeve at all times surrounding a portion of said stem to thereby guide said valve, a spring stronger than said biasing means connected with said sleeve for closing said valve, a shoulder portion on said sleeve, a latch cooperable with said shoulder portion for releasably retaining said spring in an inactive position, and means responsive to a controlling condition for causing said latch to release said shoulder whereupon said spring will close said valve.

9. In combination, a flow control device movable towards and away from a safe position, a movable wall adapted to be exposed to the pressure of the controlled fluid, means connecting said wall and said control device and effective to cause the pressure of said fluid acting against said wall to urge said flow control device away from said safe position, means for resisting movement of said wall caused by the fluid pressure, biasing means for moving said flow control device to said safe position, said biasing means being capable of exerting sufficient force to move said flow control device to said safe position against the effect of said fluid pressure on said movable wall, means for restraining said biasing means, and means operative upon said movable wall moving to a position in which said control device is separated from said safe position by more than a predetermined amount to render said restraining means ineffective whereby said biasing means is effective to move said control device back to said safe position.

10. In combination, a flow control device movable towards and away from a safe position, a movable wall adapted to be exposed to the pressure of the controlled fluid, means connecting said wall and said control device and effective to cause the pressure of said fluid acting against said wall to urge said flow control device away from said safe position, means for resisting movement of said wall caused by the fluid pressure, biasing means for moving said flow control device to said safe position, said biasing means being capable of exerting sufficient force to move said flow control device to said safe position against the effect of said fluid pressure on said movable wall, a latching arm for restraining said biasing means, said latching arm being biased into latching position, and means operative upon said movable wall moving to a position in which said control device is separated from said safe position by more than a predetermined amount to move said latching arm out of latching position whereby said biasing means is effective to move said control device back to said safe position.

11. In combination, a valve, a movable wall adapted to be exposed to the pressure of the controlled fluid, means connecting said wall and said valve and effective to cause the pressure of said fluid acting against said wall to urge said valve towards open position, means for resisting movement of said wall caused by the fluid pressure, biasing means for closing said valve, said biasing means being capable of exerting sufficient force to close said valve against the effect of said fluid pressure on said movable wall, means for restraining said biasing means, and means operative upon said movable wall moving to a position in which said control device is separated from said safe position by more than a predetermined amount to render said restraining means ineffective whereby said biasing means is effective to move said control device back to said safe position.

12. In combination, a control device normally movable between a safe first position and an active second position, direct acting condition responsive pressure means indicative of temperature normally for positioning said device between said first and second positions, biasing means for moving said device to said first position, means for restraining said biasing means, and means for rendering said restraining means inoperative if said pressure means moves to a point at which said device would be beyond said second position.

13. A valve comprising a movable valve member, a condition responsive element responsive to a condition remote from said valve and independent of the condition of the valved fluid, said condition responsive element being adapted to control the position of said valve member between closed and normal full open positions in accordance with the value of said condition, snap acting resilient means cooperating with the condition responsive element for causing the valve member to move through part of its range of movement with a snap action, means independent of the condition responsive element for closing the valve, and a latch releasable by the valve member when in an excessively wide open position to release the independent means but normally holding the independent means in inoperative position.

14. A control apparatus comprising a temperature responsive variable volume chamber, an operable device controlled by the normal expansion and contraction of said chamber in response to temperature variations, biasing means tending to move said device in the same direction it is normally moved upon expansion of said chamber, latching means for holding said biasing means in inoperative position, said latching means comprising a latching element movable substantially transversely of the path of movement of said device, and means controlled by the contraction of said chamber beyond a predetermined limit of normal contraction to cause said latching element to be moved transversely out of its latching position.

15. A control apparatus comprising a variable volume chamber containing temperature responsive fluid in a quantity sufficient to limit the contraction of said chamber in the normal operation of said apparatus, an operable device controlled by the normal expansion and contraction of said chamber, spring means operable to contract said chamber beyond said normal limit of contraction upon the loss of fluid from said chamber, a pre-loaded spring operable when released to move said operable device in the direction in which it is moved by the normal expansion of said chamber, means normally retaining said pre-loaded spring in a condition in which it has no effect upon the position of said device, and means controlled by the contraction of said chamber beyond said normal limit of contraction to release said pre-loaded spring.

16. A thermostatic valve comprising a movable valve member having a valve stem, a variable volume chamber containing temperature responsive fluid and operatively connected to said valve stem, biasing means opposing said variable volume chamber and biasing said valve to a first position, said variable volume chamber being operative upon expansion thereof due to a change in the temperature of said fluid to move said valve member towards a second position against the action of said biasing means, a pre-loaded spring operable when released to move said valve member towards said second position in the direction in which it is moved by the normal expansion of said chamber, means normally retaining said pre-loaded spring in a condition in which it has no effect upon the position of said valve member, and means including an element associated with said valve stem operative upon the contraction of said chamber beyond its normal range of contraction to release said pre-loaded spring.

GIFFORD I. HOLMES.